United States Patent
Gajapala

(10) Patent No.: US 10,460,410 B1
(45) Date of Patent: Oct. 29, 2019

(54) LOCATION SERVICES PLATFORM, APPARATUS AND METHOD FOR INFORMING LAW ENFORCEMENT PERSONNEL PLACEMENT

(71) Applicant: HERE GLOBAL B.V., Eindhoven (NL)

(72) Inventor: Buddika Gajapala, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/185,513

(22) Filed: Nov. 9, 2018

(51) Int. Cl.
*G08G 1/052* (2006.01)
*G06Q 50/26* (2012.01)
*G08G 1/01* (2006.01)
*G06F 16/29* (2019.01)

(52) U.S. Cl.
CPC ............ *G06Q 50/26* (2013.01); *G06F 16/29* (2019.01); *G08G 1/0141* (2013.01); *G08G 1/052* (2013.01)

(58) Field of Classification Search
CPC ............... G06F 16/285; G06F 16/2365; G06F 16/24544; G06F 16/24554; G06F 16/24556; G06F 16/2465; G06F 16/252; G06F 16/258; G06F 16/24573; G06F 16/951; G06F 16/2455; G07C 5/008; G07C 5/0891; G08G 1/205; G08G 1/0133; G08G 1/0129; G08G 1/0141; G08G 1/017; G08G 1/0175; G08G 1/04; G08G 1/096716; G08G 1/096741; G08G 1/096775; G08G 1/00; G08G 1/012; G08G 1/091; G08G 1/14; G08G 1/0116; G08G 1/0137; G08G 1/015; G08G 1/052; G08G 1/054; G08G 1/02;

(Continued)

(56) References Cited

U.S. PATENT DOCUMENTS 6,690,294 B1  2/2004  Zierden et al.
7,598,889 B2 * 10/2009  Maeda ................ G09B 19/167
                                                              340/439

(Continued)

OTHER PUBLICATIONS

Ahmed, S.H. et al., *SmartCop: Enabling Smart Traffic Violations Ticketing in Vehicular Named Data Networks*, Research Article, Mobile Information Systems, Hindawi Publishing Corporation, vol. 2016, Article ID 1353290 (2016) 12 pages.

*Primary Examiner* — Daniel Previl
(74) *Attorney, Agent, or Firm* — Alston & Bird LLP

(57) ABSTRACT

A location services platform includes a map database and a processor to analyze probe data and map data to identify one or more traffic violations. The processor also receives probe data associated with law enforcement personnel and correlates the locations of the traffic violations to the location of the law enforcement personnel. The location services platform includes a traffic violation database that stores information regarding the traffic violations that were identified and a law enforcement placement database that stores information regarding the location of the law enforcement personnel. The processor is further configured to determine a relationship between traffic violation citations that have been issued at a respective location and traffic violations identified to occur at the respective location in an instance in which the probe data associated with law enforcement personnel indicates that law enforcement personnel were present at the respective location. Corresponding apparatuses and method are also provided.

20 Claims, 4 Drawing Sheets

(58) Field of Classification Search
CPC ........... G08G 1/096816; G08G 1/0112; G08G 1/094; G08G 1/166; G08G 1/20; H04L 65/4069; H04W 84/12; H04W 40/02; H04W 4/046; B62D 41/00; G01C 21/26; G01C 21/3492; G01S 3/80; H04M 7/006; G06Q 30/0284; G06Q 10/06; G06Q 50/265; G07F 17/24; H04N 7/18; E01F 11/00; G06N 7/005; B64C 1/00; B64C 37/02; B64C 39/08; G06K 19/0704; G06K 19/0723; G06K 19/0728; G06K 7/1097; G06K 9/00785; G07B 15/063
USPC .... 340/936, 931, 963, 965, 973, 979, 995.1, 340/995.11, 995.12, 995.13, 995.14, 340/995.15, 995.19, 438, 441, 444, 466
See application file for complete search history.

(56) References Cited

U.S. PATENT DOCUMENTS

| | | | |
|---|---|---|---|
| 8,022,845 B2 * | 9/2011 | Zlojutro | ................. G07C 5/008 340/988 |
| 8,885,929 B2 | 11/2014 | Ni et al. | |
| 9,171,461 B1 * | 10/2015 | Dabell | ................. G08G 1/0137 |
| 9,928,735 B2 | 3/2018 | Wang | |
| 2006/0055561 A1 * | 3/2006 | Kamali | ................. G08G 1/017 340/936 |
| 2007/0087756 A1 * | 4/2007 | Hoffberg | ............ G06Q 10/0631 455/450 |
| 2013/0033386 A1 * | 2/2013 | Zlojutro | ................... G08G 1/20 340/935 |
| 2013/0215273 A1 | 8/2013 | Kareev et al. | |
| 2016/0232785 A1 * | 8/2016 | Wang | ..................... G08G 1/012 |

* cited by examiner

LOCATION SERVICES PLATFORM, APPARATUS AND METHOD FOR INFORMING LAW ENFORCEMENT PERSONNEL PLACEMENT

TECHNOLOGICAL FIELD

An example embodiment relates generally to a location services platform, apparatus and method and, more particularly, to a location services platform, apparatus and method for determining a relationship between traffic violation citations that have been issued at a respective location and traffic violations that have been identified to occur at the respective location in an instance in which law enforcement personnel were positioned at the respective location.

BACKGROUND

The operation of motorized vehicles must comply with a number of traffic laws that have been enacted to facilitate the use of a road network in a safe and efficient manner. Unfortunately, drivers traversing the various road segments of the road network may commit a wide variety of traffic violations. These traffic violations include speed limit violations in which the vehicle is exceeding the posted speed limit and various lane violations including improper utilization of a restricted lane, such as the use of a bus lane by a passenger vehicle. In addition to the traffic laws that govern motorized vehicles in general, multi-passenger transport vehicles, such as buses, also have to obey additional traffic laws that govern their operation including traffic laws limiting the number of passengers and limiting the time period during which a multi-passenger transport vehicle may remain at a stop in order to receive or discharge passengers. These various traffic violations may cause the road network to operate in a sub-optimal state.

Law enforcement personnel are utilized in order to enforce the traffic laws. Law enforcement personnel may issue citations penalizing a driver in an instance in which the vehicle operated by the driver violates one or more of the traffic laws. However, there are not a number of sufficient law enforcement personnel to patrol all road segments of a road network and, as such, not all traffic violations result in the issuance of a citation. Additionally, it is possible that even those law enforcement personnel who are patrolling the road network and are present during the commission of a traffic violation may either not identify the traffic violation or, even if identified, may choose not to issue a citation for the traffic violation for any of a variety of different reasons. As a result of the sometimes inconsistent enforcement of the traffic laws and the resulting commission of various traffic violations by vehicles traversing the road network, the road network may not always operate as efficiently as desired.

BRIEF SUMMARY

A location services platform, apparatus and method are provided in accordance with an example embodiment in order to determine a relationship between the traffic violation citations that have been issued at a respective location and the one or more traffic violations that occur at the respective location in an instance in which law enforcement personnel are also present at the respective location. Thus, the location services platform, apparatus and method provide information regarding the efficiency with which law enforcement personnel enforce the traffic laws, thereby permitting feedback to and/or training of the law enforcement personnel to be enhanced in order to increase the consistency with which the law enforcement personnel enforce the various traffic laws. In another example embodiment, the location services platform, apparatus and method are also configured to identify the location at which traffic violations occur which may, in turn, facilitate placement of law enforcement personnel at the locations at which traffic violations appear most prevalent, thereby further increasing the consistency with which the traffic laws are enforced such that the operation of the road network may be made more efficient.

In an example embodiment, a location services platform is provided that includes a map database comprising map data that provides information regarding a plurality of road segments of a road network, a processor, a traffic violation database and a law enforcement placement database. The processor is configured to receive probe data associated with vehicles traversing the road network and to analyze the probe data in conjunction with map data from the map database in order to identify one or more traffic violations and respective locations at which the one or more traffic violations occur. The processor is also configured to receive probe data associated with law enforcement personnel that identifies a location of the law enforcement personnel and to correlate the respective locations at which the one or more traffic violations occur to the location of the law enforcement personnel. The traffic violation database stores information regarding that one or more traffic violations that were identified by the processor and the respective locations at which the one or more traffic violations occur. The law enforcement placement database stores information regarding the location of the law enforcement personnel. The processor is further configured to determine, based upon information regarding traffic violation citations that have been issued by the law enforcement personnel, a relationship between the traffic violation citations that have been issued at a respective location and the one or more traffic violations that occur at the respective location in an instance in which the probe data associated with law enforcement personnel indicates that law enforcement personnel were present at the respective location.

The location services platform of an example embodiment also includes a traffic violation citation database for storing information regarding traffic violation citations that have been issued by the law enforcement personnel. In this example embodiment, the processor is configured to access the traffic violation citation database in conjunction with the determination of the relationship between the traffic violation citations that have been issued at a respective location and the one or more traffic violations that occur at the respective location.

The processor of an example embodiment is configured to analyze the probe data in conjunction with map data by identifying a speed limit violation in an instance a speed of a vehicle as determined from the probe data associated with the vehicle exceeds a speed limit defined by the map data for the road segment traversed by the vehicle. The processor of another example embodiment is configured to analyze the probe data in conjunction with map data by analyzing information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

The processor of an example embodiment is configured to analyze the probe data by identifying an instance in which the vehicle is a multi-passenger transport vehicle as a result of probe data being provided by at least a predetermined number of devices that indicates that the devices are commonly located and are traversing one or more road segments in concert. In one embodiment, the processor is also configured to analyze the probe data provided by the devices that are commonly located and are traversing the one or more road segments in concert to identify an over staying violation in which the multi-passenger transport vehicle remains at a stop for more than a maximum waiting period. In another embodiment, the processor is also configured to analyze the probe data provided by the devices that are commonly located and are traversing the one or more road segments in concert to identify an over loading violation in which the multi-passenger transport vehicle is carrying more than a maximum number of passengers.

The processor of an example embodiment is further configured to cause an alert to be transmitted to law enforcement personnel positioned at a location at which a traffic violation has been identified. The processor of another example embodiment is further configured to cause a map to be generated that represents a number of traffic violations that have been identified at one or more locations upon the map.

In another example embodiment, an apparatus is provided that includes at least one processor and at least one non-transitory memory including computer program code instructions with the computer program code instructions configured to, when executed, cause the apparatus to receive probe data associated with vehicles traversing a road network comprising a plurality of road segments and to analyze the probe data in conjunction with map data that provides information regarding the one or more road segments traversed by the vehicles in order to identify one or more traffic violations and respective locations at which the one or more traffic violations occur. The computer program code instructions are also configured to, when executed, cause the apparatus to receive probe data associated with law enforcement personnel that identifies a location of the law enforcement personnel and to correlate the respective locations at which the one or more traffic violations occur to the location of the law enforcement personnel. Based upon information regarding traffic violation citations that have been issued by the law enforcement personnel, the computer program code instructions are further configured to, when executed, cause the apparatus to determine a relationship between the traffic violation citations that have been issued at a respective location and the one or more traffic violations that occur at the respective location in an instance in which the probe data associated with law enforcement personnel indicates that law enforcement personnel were present at the respective location.

The apparatus of an example embodiment is caused to analyze the probe data in conjunction with map data by identifying a speed limit violation in an instance a speed of a vehicle as determined from the probe data associated with the vehicle exceeds a speed limit defined by the map data for the road segment traversed by the vehicle. The apparatus of another example embodiment is caused to analyze the probe data in conjunction with map data by analyzing information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

The apparatus of an example embodiment is caused to analyze the probe data by identifying an instance in which the vehicle is a multi-passenger transport vehicle as a result of probe data being provided by at least a predetermined number of devices that indicates that the devices are commonly located and are traversing one or more road segments in concert. The apparatus of an example embodiment is also caused to analyze the probe data provided by the devices that are commonly located and are traversing the one or more road segments in concert to identify an over staying violation in which the multi-passenger transport vehicle remains at a stop for more than a maximum waiting period. The apparatus of another example embodiment is caused to analyze the probe data provided by the devices that are commonly located and are traversing the one or more road segments in concert to identify an over loading violation in which the multi-passenger transport vehicle is carrying more than a maximum number of passengers.

In an example embodiment, the computer program code instructions are further configured to, when executed, cause the apparatus to cause an alert to be transmitted to law enforcement personnel positioned at a location at which a traffic violation has been identified. In another example embodiment, the computer program code instructions are further configured to, when executed, cause the apparatus to cause a map to be generated that represents a number of traffic violations that have been identified at one or more locations upon the map.

In a further example embodiment, a method is provided that includes receiving probe data associated with vehicles traversing a road network comprising a plurality of road segments and analyzing the probe data in conjunction with map data that provides information regarding the one or more road segments traversed by the vehicles in order to identify one or more traffic violations and respective locations at which the one or more traffic violations occur. The method also includes receiving probe data associated with law enforcement personnel that identifies a location of the law enforcement personnel and correlating the respective locations at which the one or more traffic violations occur to the location of the law enforcement personnel. Based upon information regarding traffic violation citations that have been issued by the law enforcement personnel, the method further includes determining a relationship between the traffic violation citations that have been issued at a respective location and the one or more traffic violations that occur at the respective location in an instance in which the probe data associated with law enforcement personnel indicates that law enforcement personnel were present at the respective location.

In an example embodiment, analyzing the probe data in conjunction with map data includes identifying a speed limit violation in an instance a speed of a vehicle as determined from the probe data associated with the vehicle exceeds a speed limit defined by the map data for the road segment traversed by the vehicle. In another example embodiment, analyzing the probe data in conjunction with map data includes analyzing information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

In an example embodiment, analyzing the probe data includes identifying an instance in which the vehicle is a multi-passenger transport vehicle as a result of probe data being provided by at least a predetermined number of devices that indicates that the devices are commonly located and are traversing one or more road segments in concert. In one embodiment, analyzing the probe data also includes analyzing the probe data provided by the devices that are commonly located and are traversing the one or more road segments in concert to identify an over staying violation in which the multi-passenger transport vehicle remains at a stop for more than a maximum waiting period. In another embodiment, analyzing the probe data includes analyzing the probe data provided by the devices that are commonly located and are traversing the one or more road segments in concert to identify an over loading violation in which the multi-passenger transport vehicle is carrying more than a maximum number of passengers.

The method of an example embodiment also includes causing an alert to be transmitted to law enforcement personnel positioned at a location at which a traffic violation has been identified. The method of another example embodiment includes causing a map to be generated that represents a number of traffic violations that have been identified at one or more locations upon the map.

In a further example embodiment, a computer program product is provided that includes at least one non-transitory computer-readable storage medium having computer-executable program code instructions stored therein with the computer-executable program code instructions including program code instructions configured, upon execution, to receive probe data associated with vehicles traversing a road network comprising a plurality of road segments and to analyze the probe data in conjunction with map data that provides information regarding the one or more road segments traversed by the vehicles in order to identify one or more traffic violations and respective locations at which the one or more traffic violations occur. The computer-executable program code instructions also include program code instructions configured, upon execution, to receive probe data associated with law enforcement personnel that identifies a location of the law enforcement personnel and to correlate the respective locations at which the one or more traffic violations occur to the location of the law enforcement personnel. Based upon information regarding traffic violation citations that have been issued by the law enforcement personnel, the computer-executable program code instructions further include program code instructions configured, upon execution, to determine a relationship between the traffic violation citations that have been issued at a respective location and the one or more traffic violations that occur at the respective location in an instance in which the probe data associated with law enforcement personnel indicates that law enforcement personnel were present at the respective location.

In an example embodiment, the program code instructions configured to analyze the probe data in conjunction with map data include program code instructions configured to identify a speed limit violation in an instance a speed of a vehicle as determined from the probe data associated with the vehicle exceeds a speed limit defined by the map data for the road segment traversed by the vehicle. In another example embodiment, the program code instructions configured to analyze the probe data in conjunction with map data includes program code instructions configured to analyze information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

In an example embodiment, the program code instructions configured to analyze the probe data include program code instructions configured to identify an instance in which the vehicle is a multi-passenger transport vehicle as a result of probe data being provided by at least a predetermined number of devices that indicates that the devices are commonly located and are traversing one or more road segments in concert. In one embodiment, the program code instructions configured to analyze the probe data also include program code instructions configured to analyze the probe data provided by the devices that are commonly located and are traversing the one or more road segments in concert to identify an over staying violation in which the multi-passenger transport vehicle remains at a stop for more than a maximum waiting period. In another embodiment, the program code instructions configured to analyze the probe data include program code instructions configured to analyze the probe data provided by the devices that are commonly located and are traversing the one or more road segments in concert to identify an over loading violation in which the multi-passenger transport vehicle is carrying more than a maximum number of passengers.

The computer-executable program code instructions of an example embodiment further include program code instructions configured, upon execution, to cause an alert to be transmitted to law enforcement personnel positioned at a location at which a traffic violation has been identified. The computer-executable program code instructions of another example embodiment further include program code instructions configured, upon execution, to cause a map to be generated that represents a number of traffic violations that have been identified at one or more locations upon the map.

BRIEF DESCRIPTION OF THE DRAWINGS

Figure 1:
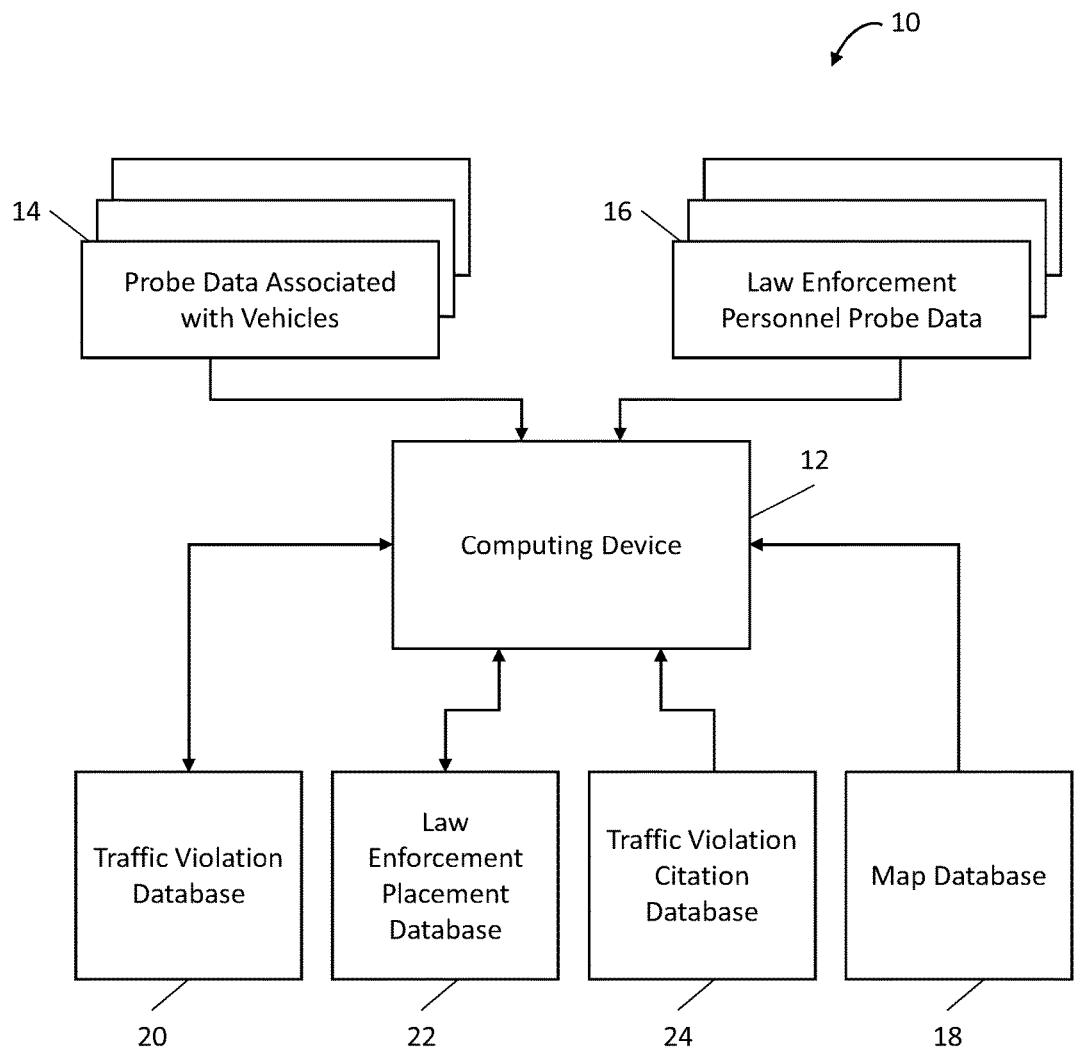
Figure 2:
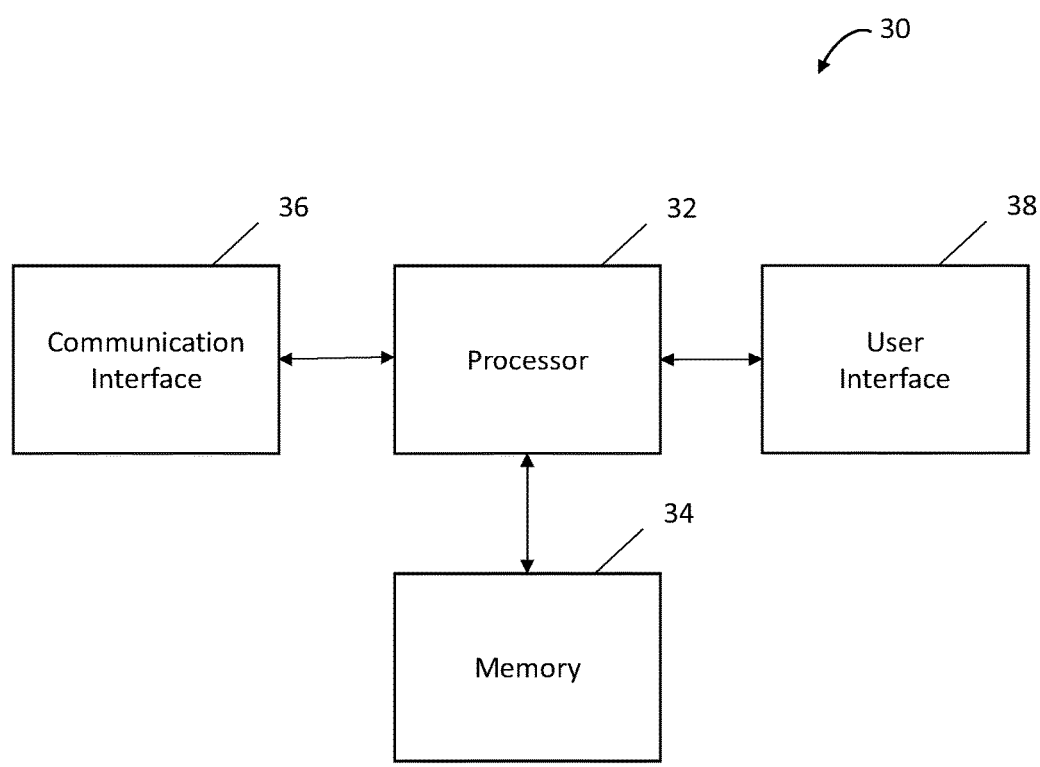
Figure 3:
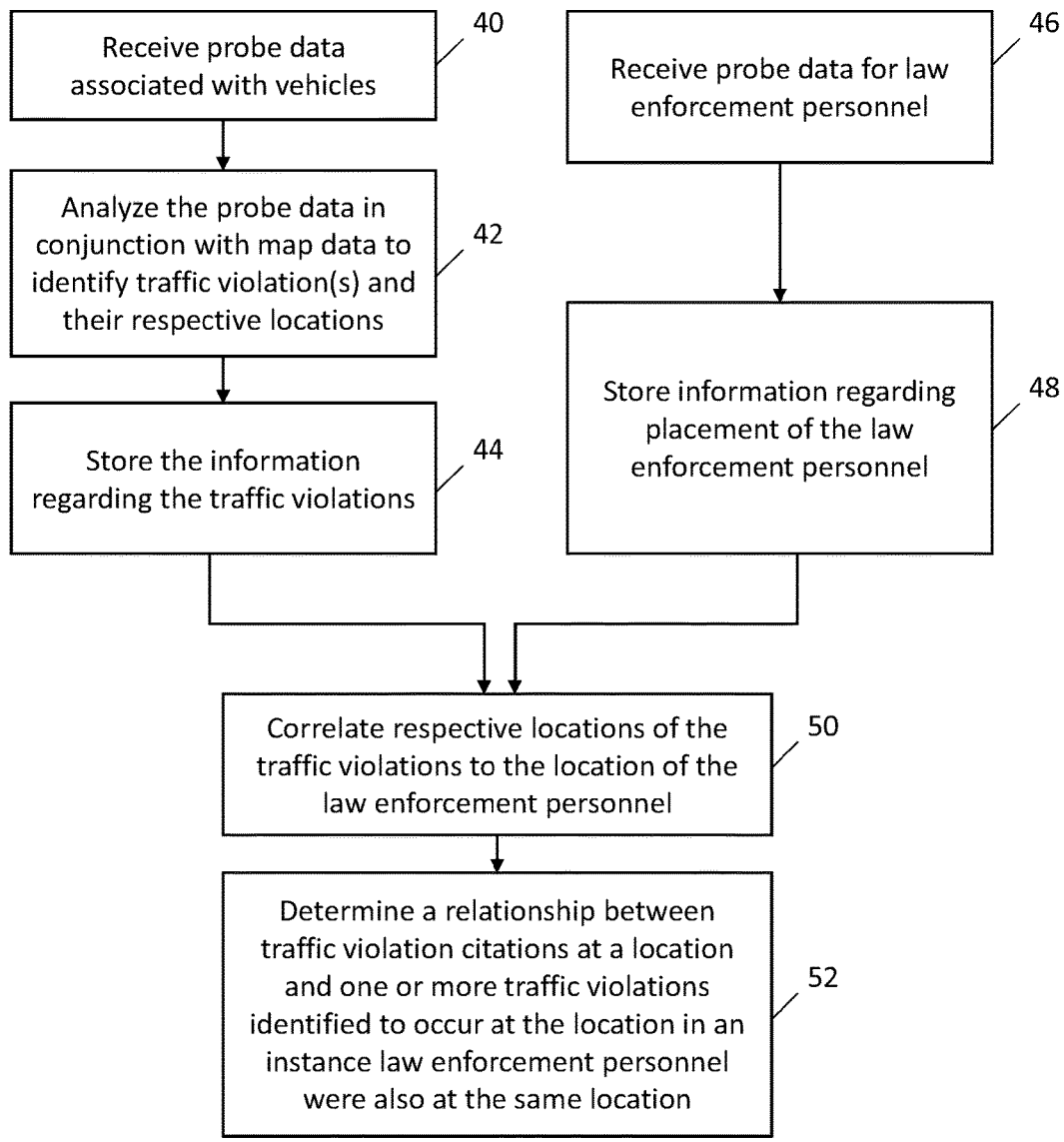
Figure 4:
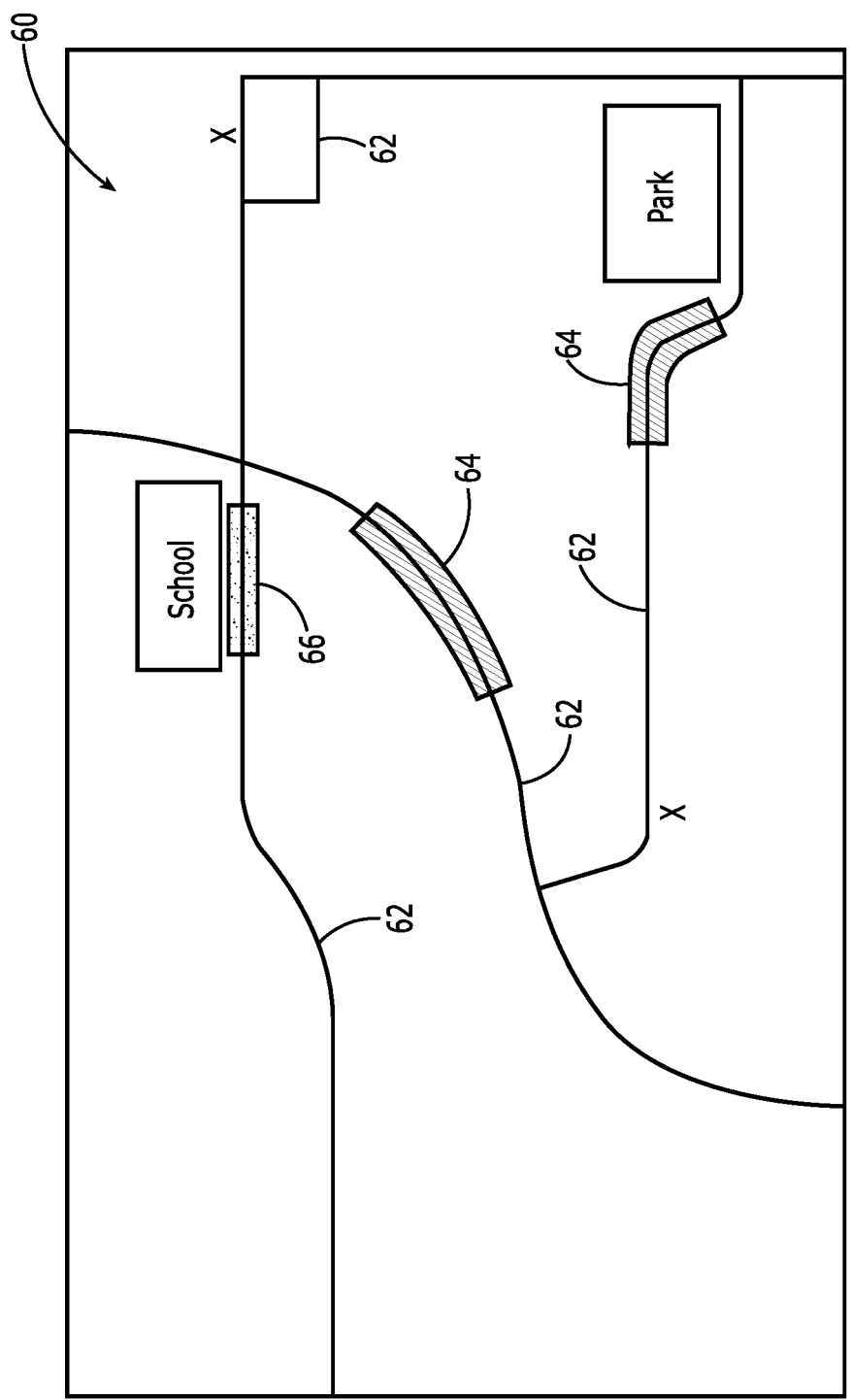

Having thus described the invention in general terms, reference will now be made to the accompanying drawings, which are not necessarily drawn to scale, and wherein:

FIG. 1 is a block diagram of a location services platform in accordance with an example embodiment of the present disclosure;

FIG. 2 is a block diagram of an apparatus that may be specifically configured in accordance with an example embodiment of the present disclosure;

FIG. 3 is flowchart illustrating operations performed, such as by the apparatus of FIG. 2, in accordance with an example embodiment of the present disclosure; and FIG. 4 is a map generated in accordance with an example embodiment of the present disclosure that provides a graphical representation of the number of traffic violations that have been identified at various locations on the map.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A location services platform, apparatus, method and computer program product are provided in accordance with an example embodiment to analyze probe data relative to map data that provides information regarding a plurality of road segments of a road network in order to determine a relationship between traffic violation citations that have been issued at a respective location and the one or more traffic violations that are identified to have occurred at the respective location in an instance in which law enforcement personnel were present at the location. Based on this relationship, the efficiency with which the law enforcement personnel issue traffic violation citations for traffic violations may be determined, thereby increasing the accountability of the law enforcement personnel and facilitating the identification of law enforcement personnel who may benefit from additional training. The location services platform, apparatus, method and computer program product of an example embodiment may also analyze probe data relative to map data to identify the locations at which traffic violations are identified to occur as well as the locations at which law enforcement personnel were positioned. As a result, the deployment of the law enforcement personnel may be enhanced, such as by repositioning more law enforcement personnel to locations at which more traffic violations are identified to occur with more regularity in order to increase the efficiency with which the law enforcement personnel issue citations for traffic violations. By providing more efficient and more consistent issuance of traffic violation citations, the operation of the road network and the flow of traffic therealong may be improved.

A location services platform 10 of an example embodiment is depicted in FIG. 1. The location services platform may be configured to provide a variety of location services including, for example, mapping and navigation services. By leveraging the probe data and the map data that may also be utilized for other location services, such as mapping or navigation services, the location services platform of an example embodiment is also configured to identify traffic violations and the relationship between traffic violation citations that have been issued at a respective location and the traffic violations that were identified to have occurred at the respective location, such as in instances in which law enforcement personnel were also present at the respective location.

As shown in FIG. 1, the location services platform 10 includes a computing device 12, such as one or more servers or a cloud computing architecture, configured to perform the various operations described hereinafter. The computing device is configured to receive probe data 14 associated with vehicles traversing the plurality of road segments of a road network. The probe data may be provided by any of a variety of devices that are carried by the vehicle. For example, the devices that provide the probe data to the location services platform may include various systems integrated into the vehicle including a mapping or navigation system onboard the vehicle, an advanced driver assistance system (ADAS) onboard the vehicle or the like, or a mobile device carried by the driver of the vehicle or passengers of the vehicle. In this regard, the mobile device carried by the driver or passenger may include a personal digital assistant (PDA), mobile telephone, smart phone, personal navigation device, wearable device, smart watch, tablet computer or the like. Regardless of the type of device that provides the probe data associated with the vehicle, the probe data provided by the device may define various parameters associated with the vehicle at each of a plurality of different points in time while the vehicle traverses the road network. In this regard, the probe data collected at a respective instance in time may include one or more of the following: a unique identifier associated with the device or the vehicle, an identifier indicating the type of vehicle, such as a manually driven passenger vehicle, an autonomous passenger vehicle, a semi-autonomous passenger vehicle, a multi-passenger transport vehicle or the like, a unique identifier associated with the passenger or the driver, a time stamp and location, such as latitude and longitude, at which the probe data was collected, the speed of the vehicle, the heading of the vehicle, and/or a unique identifier associated with the road segment and/or the link representing the road segment along which the vehicle is traveling. The probe data associated with the vehicles need not include all of the foregoing parameters, which are provided by way of example, but may include a subset of those parameters and may optionally include one or more additional parameters. In addition, while the probe data may provide the speed and heading of the vehicle, the probe data may, instead, provide other parameters, such as a series of time and location pairs captured at different instances of time, from which the speed and heading of the vehicle may be determined.

As shown in FIG. 1, the computing device 12 is also configured to receive law enforcement personnel probe data 16. The law enforcement personnel probe data may be provided by devices carried by or otherwise associated with the law enforcement personnel while in the field, such as while patrolling the road network. By way of example, the law enforcement personnel probe data may be provided by a mapping or navigation device or other onboard computing device carried by the patrol car, or by a mobile device carried by the law enforcement personnel. Regardless of the type of device that provides law enforcement personnel probe data, the law enforcement personnel probe data collected at an instance of time may include a unique identifier associated with the law enforcement officer, the time at which the probe data was captured, the location, such as latitude and longitude, at which the probe data was captured including, in some embodiments, an indication as to the side of the road, e.g., left or right, where the law enforcement personnel is located and/or an identifier of the road segment or the link representing the road segment patrolled by the law enforcement personnel.

As shown in FIG. 1, the location services platform 10 of an example embodiment also includes a plurality of databases. As described below, the location services platform of an example embodiment includes a traffic violation database 20 including information associated with one or more traffic violations identified from the probe data 14 by the location services platform. The location services platform of the illustrated embodiment also includes a law enforcement placement database 22 that includes information, based upon the law enforcement personnel probe data 16, that identifies the location of the law enforcement personnel at various instances in time. The location services platform of this example embodiment also includes or is otherwise in communication with a traffic violation citation database 24 that includes information regarding the traffic violations citations that have been issued by the law enforcement personnel.

The location services platform 10 of an example embodiment also includes or is otherwise in communication with a map database 18. The map database represents road segments in a geographic area. In this regard, the map database contains map data that indicates attributes of the road segments. The map database may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths, sidewalks or other types of pedestrian segments as well as open areas or parks in addition to the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 18 of an example embodiment also includes information regarding various traffic laws applicable to the road segments. For example, the map data may include information regarding the posted speed limits of the road segments and/or lane restrictions associated with the road segments. In some embodiments, the map database may also include information regarding the stops to be made by multi-passenger transport vehicles, such as busses, including the location of the stops and/or the maximum length of time that the multi-passenger transport vehicle is permitted to wait at a stop.

The map database 18 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation.

As mentioned above, the map database 18 may be a master geographic database, but in alternate or complementary embodiments, a client side map database may represent a compiled navigation database that may be used in or with end user devices to provide navigation and/or map-related functions. In such a case, the map database can be downloaded or stored on the end user device which can access the map database through a wireless or wired connection, such as a communications network.

As described above, the computing device 12 may be embodied by a variety of different types of computing devices including one or more servers, a cloud computing architecture or the like. Regardless of the manner in which the computing device is embodied, the computing device of an example embodiment includes an apparatus 30, such as depicted in FIG. 2 that includes, is associated with or is otherwise in communication with a processor 32, a memory device 34, a communication interface 36 and optionally a user interface 38. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment may also optionally include a communication interface 36 that may be any means such as a device or circuitry embodied in either hardware or a combination of hardware and software that is configured to receive and/or transmit data from/to other electronic devices in communication with the apparatus, such as via near field communication (NFC) or other proximity-based communication techniques. Additionally or alternatively, the communication interface may be configured to communicate over any of various wireless communication protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 30 of an example embodiment may also optionally include or otherwise be in communication with a user interface 38. The user interface may include a touch screen display, a speaker, physical buttons, and/or other input/output mechanisms. In an example embodiment, the processor 32 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 34, and/or the like).

Referring now to FIG. 3, the operations performed, such as by the apparatus 30 of FIG. 2, in accordance with an example embodiment are depicted. As shown in block 40 of FIG. 3, the apparatus of an example embodiment includes means, such as the processor 32, the communication interface 36 or the like, for receiving probe data 14 associated with vehicles, such as described above and as shown in FIG. 1. The probe data may be received from the devices that collect the probe data or the probe data may be stored, such as in a database, which may be accessed by the apparatus in order to receive the probe data therefrom.

As shown in block 42 of FIG. 3, the apparatus 30 also includes means, such as a processor 32 or the like, for analyzing the probe data 14 associated with the vehicles in conjunction with map from the map database 18 in order to identify one or more traffic violations, as well as the respective locations at which the one or more traffic violations occur. The apparatus, such as processor, may be configured to identify any of a variety of different types of traffic violations from the probe data.

In one embodiment, the apparatus 30, such as the processor 32, is configured to identify a speed limit violation. In this example embodiment the apparatus, such as the processor, is configured to analyze the probe data 14 associated with the vehicle in conjunction with the map data to identify an instance in which the speed of the vehicle as determined from the probe data associated with the vehicle exceeds a speed limit as defined by the map data for the road segment traversed by the vehicle, thereby identifying a speed limit violation. In this regard, the probe data that is received and is associated with the vehicle may provide information regarding the speed of the vehicle, either by providing the speed itself or by providing information regarding the location of the vehicle at each of the plurality of different instances in time from which the speed can be determined. The probe data also provides an indication of the location at which the probe data was captured and/or the identity of the road segment or the link representative of the road segment along which the vehicle was traveling while the probe data was captured. Based upon the location and/or the identity of the road segment or the link representative of the road segment along which the vehicle was traveling, the apparatus, such as the processor, can access the map data from the map database 18 and determine the road segment that is being traversed by the vehicle and, in turn, the posted speed limit of the road segment. By comparing the speed of the vehicle with the posted speed limit for the road segment traversed by the vehicle and identifying instances in which the speed of the vehicle exceeds the speed limit, the apparatus, such as the processor, of this example embodiment is configured to identify a speed limit violation.

As another example, the apparatus 30, such as the processor 32, is additionally or alternatively configured to identify a lane violation. In this example embodiment, the apparatus, such as the processor, is configured to analyze information from the probe data 14 associated with a vehicle from which a heading of the vehicle may be determined. The probe data also provides an indication of the location at which the probe data was captured and/or the identity of the road segment or the link representative of the road segment along which the vehicle was traveling while the probe data was captured. Based upon the location and/or the identity of the road segment or the link representative of the road segment along which the vehicle was traveling, map data may be retrieved from the map database 18 regarding one or more lanes of the road segment traversed by the vehicle and one more restrictions placed upon the one or more lanes in order to identify whether a lane violation has occurred. The probe data associated with the vehicle that is received by the apparatus may include the heading of the vehicle at each of the plurality of instances in time. Alternatively, the probe data may include information regarding the location at which the probe data was captured and the time in which the probe data was captured at each of a plurality of instances of time such that the apparatus, such as the processor, can determine the heading of the vehicle based thereupon. Thus, the apparatus, such as the processor, determines the direction in which the vehicle is traveling based upon the heading of the vehicle.

Depending upon the location of the vehicle as defined by the probe data 14 that is received, the apparatus 30, such as the processor 32, of this example embodiment is configured to analyze the map data received from the map database 18 in order to identify the road segment traversed by the vehicle and the lane of the road segment that is traversed by the vehicle. In this regard, the map data can provide information not only about the road segments including the identity and/or location of the road segments, but also information regarding the number and location or size of the lanes of a respective road segment. Based upon the information received from the map database regarding one or more restrictions placed upon the one or more lanes, the apparatus, such as the processor, is configured to determine whether the vehicle is in compliance with the more or restrictions placed upon the lane of the road segment being traversed by the vehicle or whether a lane violation is occurring as result of the violation of one or more restrictions associated with the lane being traversed by the vehicle. Various restrictions may be placed upon lanes of a road. For example, a directional restriction may be placed upon the lane of a road indicating the direction in which traffic is to travel along the lane. Additionally, a restriction may be imposed upon a lane limiting the type of vehicles that can utilize the lane with the use of some lanes being limited to multi-passenger transport vehicles and other lanes being limited to passenger vehicles.

In relation to a directional restriction, the apparatus 30, such as the processor 32, is configured to identify a lane violation in an instance in which the heading of the vehicle as determined from the probe data 14 associated with the vehicle indicates that the vehicle is traversing the lane of the road segment in a different direction, such as in an opposite direction, to the direction in which the directional restriction limits traffic flow along the lane of the road segment. Alternatively, in relation to a restriction as to the type of vehicle that can utilize a lane and, more particularly, in relation to a restriction that limits the use of a lane to a multi-passenger transport vehicle, the probe data may identify the type of vehicle with which the probe data is associated. In this instance, the apparatus, such as the processor, is configured to identify a lane violation in an instance in which the type of vehicle that provides the probe data is different than the type of vehicle that is permitted to utilize the lane in which the vehicle is currently traveling, such as in an instance in which the probe data indicates that the vehicle is a passenger vehicle, but the lane utilized by the vehicle is limited to multi-passenger transport vehicles. Although a speed limit violation and a lane violation have been described above, the apparatus, such as the processor, of other example embodiments may be configured to identify a wide variety of other types of traffic violations.

In relation to the analysis of the probe data to identify traffic violations, the apparatus 30, such as the processor 32, of an example embodiment is also configured to identify an instance in which the vehicle is a multi-passenger transport vehicle. ****Upon determining the that the vehicle is a multi-passenger transport vehicle, to determine whether the multi-passenger transport vehicle has committed a traffic violation. In this regard, the apparatus includes means, such as the processor or the like, for identifying instance in which the vehicle is a multi-dish passenger transport vehicle, the apparatus, such as the processor, of this example embodiment is configured to determine based upon the probe data that has been received as to whether the probe data has been provided by at least a predetermined number of devices that a commonly located in and are traversing one or more road segments in concert. In this regard, the predetermined number of device may be a number that exceeds the likely number of people in a passenger vehicle such that the determination by the apparatus, such as the processor, that a larger number of devices are commonly located and moving together along a road segment is indicative of the transport of the passenger in a multi-passenger transport vehicle as opposed to a passenger vehicle. Although described in here as to probe data from a predetermined number of devices the predetermined number of devices maybe a predetermined of devices that are associated with different people in instance in which the probe data provided by the devices also includes an indication as to the person or user of the device so as to avoid double counting in an instance in which a single passenger has multi devices.

In an example embodiment, the apparatus of this example embodiment also includes means, such as the processor or the like for analyzing the probe data provided by the devices that are commonly located and traversing the one or more road segments in concert to identifying an over staying violation. In this regard a multi-passenger transport vehicle may only be allowed to remain at a stop for at most a maximum waiting period. The maximum waiting period maybe provided, for example, by the map data from the data base that defines any restrictions such as the maximum waiting time, associated with one or more stops, such as bus stops, for multi-passenger transport vehicle in this regard, the apparatus, such as processor, is configured to review the information regarding the location and time at which the probe data was captured and to identify an instance in which the location of the probe data provided by the devices remains constant and remains co-located with the stop for a time period that exceed the maximum waiting period in which case the apparatus, such as the processor, identifies an overstaying violation.

In another example embodiment, the apparatus includes means, such as processor or the like, for analyzing the probe data provided by the devices that are commonly located and are traversing the one or more road segments in concert to identify an overloading violation. In this regard, an overloading violation occurs in an instance in which a multi-passenger transport vehicle is carrying more than a maximum number of passengers. The maximum number of passengers that maybe legally carried by a multi-passenger transport may be predefined and maybe stored, for example, by the memory device or maybe accessible by the apparatus from an external database. In this example embodiment, the apparatus, such as the processor, is configured to analyze the probe data to identify the number of devices that are commonly located in are traversing the one or more road segments in concert to identify an instance in which the number of devices exceeds the maximum number of passengers and, in this instance, to identify an over loading violation. Alternatively, in an instance in which the probe data provided by a device includes information identifying the person or user associated with the device, the apparatus, such as the processor, of this example embodiment is configured to analyze the probe data so as to identify the number of different people or users of the devices that are providing probe data and that are commonly located and that are traversing the one or more road segments in concerts and to identify an overloading violation in an instance in which the number of people associated with the devices exceeds although overstaying violations and over loading violations have been described, the apparatus of other example embodiments may be configured to identify other types of violations associated with a multi-passenger transport vehicle.

Following the analysis of the probe data in conjunction with the map data from the map database in the identification of one or more traffic violations, the apparatus, such as the processor, the memory device or like is configured to store information regarding the one or more traffic violation that have been identified in traffic violation database. In this regard, the information stored in the traffic violation database may include an identification of the type of violation as well as the location at which the traffic violation occurred. Further, the information regarding the traffic violation as stored by the traffic violation database may include in some embodiments, a time stamp associated with the time at which the traffic violation occurred an identifier associated with the respective traffic violation, the road segment or link identifier associated with the road segment along which the traffic violation occurred and information from the probe data including, for example, the speed of the vehicle, the heading of the vehicle the probe count, etc.

As shown in block 46 of FIG. 3, the apparatus 30 also includes means, such as the processor 32 the communication interface 36 or the like for receiving probe data associated with law enforcement personnel. The probe data received from law enforcement personnel maybe received from devices associated with the law enforcement personnel or from a database that stores the probe data received from devices associated with law enforcement personnel. As noted above, among other parameters, the probe data associated with law enforcement personnel identifies the location of the law enforcement personnel at the time that the probe data was captured. As shown in block 48 of FIG. 3, the apparatus may also include mean, such as the processor, the memory 34 or the like, for storing information regarding the placement of the law enforcement personnel in a law enforcement placement database 22. In this regard, the law enforcement placement database stores information from the probe data that is received from the law enforcement personnel regarding the location of the law enforcement personnel while all of the probe data provided by the law enforcement may be stored in the law enforcement placement database, the apparatus, such as the processor, of an example embodiment is configured to identify probe data from a law enforcement officer that indicates that the law enforcement officer is stationary and has not moved for some period of time. In such an instance, the apparatus, such as the processor, is configured to store a single record indicating the location of the officer and the period of time at which the officer remained at the location. As such, the amount of data that is stored and the corresponding memory requirements are reduced along with the processing and communication resources required to store the records. As such, the law enforcement placement database of an example embodiment may include records that identify the officer, the location of the officer, the time period, such as a beginning time and an ending time at which the officer remained at the location, the road segment or linked identifier associated with the road segment along which the officer was located and, in some embodiment, the side of the road segment, such as the left side or the right along with the officer was located.

As shown in block 50 of FIG. 3, the apparatus of an example embodiment includes means, such as processor or the like, for correlating the respective location at which one or more traffic violations were identified to have occurred to the location of the law enforcement personnel. In this regard for each of the plurality of traffic violations stored by the traffic violation database, the apparatus, such as the processor, is configured to compare the location and time at which the traffic violation occurred to the record stored by the law enforcement placement database in order to identify an instance in which a law enforcement was at the same location at the same time. In this regard, the apparatus, such processor, the memory device or the like, may maintain a listing or otherwise identify those traffic violations from the traffic violation database for which law enforcement personnel were at the same location during the same period time.

As shown in block 52 of FIG. 3, the apparatus also includes means, such as the processor or the like, for determining, based upon information regarding traffic violations citations that have been issued by law enforcement personnel, a relationship between the traffic violation citations that have been issued at a respective location two one or more traffic violations that occur at the respective location in an instance in which the probe data associated with the law enforcement personnel indicates that law enforcement were present at the respective location at the time at which the one or more traffic violations occur. Thus, the apparatus, such the processor, determines a relationship between those traffic violation that have been identified to occur at a location and a time that coincident with a law enforcement officer being present at the same location during the same time period to traffic violation citations that have been issued by the law enforcement personnel. As a result of the relationship, the ratio of traffic violation citations to the total number of traffic violations that occur at the respective location while law enforcement personnel are also at the respective location may be determined this relationship may provide a measure of the efficiency with which law enforcement personnel enforce the various traffic law at least at the respective location. While this relationship maybe determined for traffic violations in general, the apparatus, such as the processor, of an example embodiment is configured to separately identify a relationship for each of a plurality of different types of violations, such as a speed limit violation, a lane violation or the like. The relationship that is determines by the apparatus, such as the processor, can also be determined for law enforcement personnel in general as well as separately for each individual law enforcement officer present at the respective location. Thus, discrepancies between the efficiency of the different law enforcements officers in relation to the issuance the traffic violation citations maybe identified with such information utilized for training purposes.

As noted above, the relationship that is determined is based upon information regarding traffic violations that have been issued by law enforcement personnel. Thus, the apparatus, such as the processor is also able to access a traffic violation citation database 24 that includes information each of the plurality of traffic violation citations that have been issued. As such, the traffic violation citation database includes a record associated with each traffic violation citation that includes information regarding the traffic violation citation. For example, the information regarding the traffic violation citation may include an identifier associated with the traffic violation citation an identifier associated with the law enforcement officer that issued the traffic violation citation, the time at which the traffic violation citation was issued and the location at which the traffic violation citation was issued.

Based upon the identification of traffic violation as described above, the location services platform, apparatus and method may also be configured to provide various services. For example, the apparatus of example embodiment includes means, such as the processor, the user interface or like, for causing map to be generated that represents the number of traffic violation that have identified at one or more locations upon the map. Thus, the apparatus, such the processor, is configured to access traffic violation database and based upon the location associated with traffic violation identify the number of traffic violations that have occurred at different locations this information may be overlaid onto a map display. Depending upon the number of traffic violations have been identified to occur a different locations upon the map, different portions of the map be modified to present information regarding the number of traffic violations. For example, for a certain period of time, between 5 and 10 traffic violations maybe identified as shown at 64 in the map of FIG. 4 by solid cross hatching while more than 10 traffic violations within the same period of time maybe represented by an alternating solid and dashed cross hatching based upon this information, law enforcement personnel can readily determine locations at which law enforcement personnel should positioned as shown in FIG. 4, various points must be designated upon the map with those points of interest about which traffic violations maybe particularly disadvantageous, such as schools and parks.

Another example embodiment, the apparatus, includes means, such as the processor, the communication interface or the like, for causing and alert to be transmitted to law enforcement personnel positioned at location at which a traffic violation has been identified. In this regard the identification of the traffic violation based upon probe data associated with the vehicle and the transmission of the alert to the law enforcement personnel at the location at which the traffic violation occurred may occur in real time or near real time such that the law enforcement officers is alerted to the traffic violation and may stop the vehicle an issue a traffic violation citation, thereby increasing the efficiency of the law enforcement personnel.

[In some embodiments, the apparatus, such as the processor, is configured to identify the lane along which the vehicle is traveling based upon machine learning techniques. In this regard, the probe data associated vehicle may include location data. However, location data may not always be precise and in some embodiment may incorporate at least some misalignment such as in instances in which the location is provided by a Global Positioning System (GPS) and the line of sight from the GPS sensor to the GPS satellites is substandard. In this instance, the apparatus, such as the processor utilizing machine learning techniques may analyze the probe data regarding the location of vehicle and may determine the lane of the road segment that the vehicle is likely traveling along as a result of prior training of the machine learning technique based upon combinations of location data and lane assignments for other vehicles.]

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by a processor 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A location services platform comprising:
   a map database comprising map data that provides information regarding a plurality of road segments of a road network;
   a processor configured to:
      receive probe data associated with vehicles traversing the road network;
      analyze the probe data in conjunction with map data from the map database in order to identify one or more traffic violations and respective locations at which the one or more traffic violations occur;
      receive probe data associated with law enforcement personnel that identifies a location of the law enforcement personnel; and correlate the respective locations at which the one or more traffic violations occur to the location of the law enforcement personnel;
a traffic violation database for storing information regarding that one or more traffic violations that were identified by the processor and the respective locations at which the one or more traffic violations occur; and
a law enforcement placement database for storing information regarding the location of the law enforcement personnel,
wherein the processor is further configured to determine, based upon information regarding traffic violation citations that have been issued by the law enforcement personnel, a relationship between the traffic violation citations that have been issued at a respective location and the one or more traffic violations that occur at the respective location in an instance in which the probe data associated with law enforcement personnel indicates that law enforcement personnel were present at the respective location.

2. A location services platform according to claim 1 further comprising a traffic violation citation database for storing information regarding traffic violation citations that have been issued by the law enforcement personnel, wherein the processor is configured to access the traffic violation citation database in conjunction with determination of the relationship between the traffic violation citations that have been issued at a respective location and the one or more traffic violations that occur at the respective location.

3. A location services platform according to claim 1 wherein the processor is configured to analyze the probe data in conjunction with map data by identifying a speed limit violation in an instance a speed of a vehicle as determined from the probe data associated with the vehicle exceeds a speed limit defined by the map data for the road segment traversed by the vehicle.

4. A location services platform according to claim 1 wherein the processor is configured to analyze the probe data in conjunction with map data by analyzing information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

5. A location services platform according to claim 1 wherein the processor is configured to analyze the probe data by:
identifying an instance in which the vehicle is a multi-passenger transport vehicle as a result of probe data being provided by at least a predetermined number of devices that indicates that the devices are commonly located and are traversing one or more road segments in concert; and
analyzing the probe data provided by the devices that are commonly located and are traversing the one or more road segments in concert to identify an over staying violation in which the multi-passenger transport vehicle remains at a stop for more than a maximum waiting period.

6. A location services platform according to claim 1 wherein the processor is configured to analyze the probe data by:
identifying an instance in which the vehicle is a multi-passenger transport vehicle as a result of probe data being provided by at least a predetermined number of devices that indicates that the devices are commonly located and are traversing one or more road segments in concert; and
analyzing the probe data provided by the devices that are commonly located and are traversing the one or more road segments in concert to identify an over loading violation in which the multi-passenger transport vehicle is carrying more than a maximum number of passengers.

7. A location services platform according to claim 1 wherein the processor is further configured to cause an alert to be transmitted to law enforcement personnel positioned at a location at which a traffic violation has been identified.

8. A location services platform according to claim 1 wherein the processor is further configured to cause a map to be generated that represents a number of traffic violations that have been identified at one or more locations upon the map.

9. An apparatus comprising at least one processor and at least one non-transitory memory including computer program code instructions, the computer program code instructions configured to, when executed, cause the apparatus to:
receive probe data associated with vehicles traversing a road network comprising a plurality of road segments;
analyze the probe data in conjunction with map data that provides information regarding the one or more road segments traversed by the vehicles in order to identify one or more traffic violations and respective locations at which the one or more traffic violations occur;
receive probe data associated with law enforcement personnel that identifies a location of the law enforcement personnel;
correlate the respective locations at which the one or more traffic violations occur to the location of the law enforcement personnel; and
based upon information regarding traffic violation citations that have been issued by the law enforcement personnel, determine a relationship between the traffic violation citations that have been issued at a respective location and the one or more traffic violations that occur at the respective location in an instance in which the probe data associated with law enforcement personnel indicates that law enforcement personnel were present at the respective location.

10. An apparatus according to claim 9 wherein the apparatus is caused to analyze the probe data in conjunction with map data by identifying a speed limit violation in an instance a speed of a vehicle as determined from the probe data associated with the vehicle exceeds a speed limit defined by the map data for the road segment traversed by the vehicle.

11. An apparatus according to claim 9 wherein the apparatus is caused to analyze the probe data in conjunction with map data by analyzing information from the probe data regarding a heading of a vehicle and the location of the vehicle relative to information from the map data regarding one or more lanes of the road segment traversed by the vehicle and one or more restrictions placed upon the one or more lanes in order to identify a lane violation in which the vehicle violates the one or more restrictions placed upon the one or more lanes.

12. An apparatus according to claim 9 wherein the apparatus is caused to analyze the probe data by:
identifying an instance in which the vehicle is a multi-passenger transport vehicle as a result of probe data being provided by at least a predetermined number of devices that indicates that the devices are commonly located and are traversing one or more road segments in concert; and analyzing the probe data provided by the devices that are commonly located and are traversing the one or more road segments in concert to identify an over staying violation in which the multi-passenger transport vehicle remains at a stop for more than a maximum waiting period.

13. An apparatus according to claim 9 wherein analyzing the probe data comprises:

identifying an instance in which the vehicle is a multi-passenger transport vehicle as a result of probe data being provided by at least a predetermined number of devices that indicates that the devices are commonly located and are traversing one or more road segments in concert; and analyzing the probe data provided by the devices that are commonly located and are traversing the one or more road segments in concert to identify an over loading violation in which the multi-passenger transport vehicle is carrying more than a maximum number of passengers.

14. An apparatus according to claim 9 wherein the computer program code instructions are further configured to, when executed, cause the apparatus to cause an alert to be transmitted to law enforcement personnel positioned at a location at which a traffic violation has been identified.

15. An apparatus according to claim 9 wherein the computer program code instructions are further configured to, when executed, cause the apparatus to cause a map to be generated that represents a number of traffic violations that have been identified at one or more locations upon the map.

16. A method comprising:

receiving probe data associated with vehicles traversing a road network comprising a plurality of road segments;

analyzing the probe data in conjunction with map data that provides information regarding the one or more road segments traversed by the vehicles in order to identify one or more traffic violations and respective locations at which the one or more traffic violations occur;

receiving probe data associated with law enforcement personnel that identifies a location of the law enforcement personnel;

correlating the respective locations at which the one or more traffic violations occur to the location of the law enforcement personnel; and based upon information regarding traffic violation citations that have been issued by the law enforcement personnel, determining a relationship between the traffic violation citations that have been issued at a respective location and the one or more traffic violations that occur at the respective location in an instance in which the probe data associated with law enforcement personnel indicates that law enforcement personnel were present at the respective location.

17. A method according to claim 16 wherein analyzing the probe data comprises:

identifying an instance in which the vehicle is a multi-passenger transport vehicle as a result of probe data being provided by at least a predetermined number of devices that indicates that the devices are commonly located and are traversing one or more road segments in concert; and analyzing the probe data provided by the devices that are commonly located and are traversing the one or more road segments in concert to identify an over staying violation in which the multi-passenger transport vehicle remains at a stop for more than a maximum waiting period.

18. A method according to claim 16 wherein analyzing the probe data comprises:

identifying an instance in which the vehicle is a multi-passenger transport vehicle as a result of probe data being provided by at least a predetermined number of devices that indicates that the devices are commonly located and are traversing one or more road segments in concert; and analyzing the probe data provided by the devices that are commonly located and are traversing the one or more road segments in concert to identify an over loading violation in which the multi-passenger transport vehicle is carrying more than a maximum number of passengers.

19. A method according to claim 16 further comprising causing an alert to be transmitted to law enforcement personnel positioned at a location at which a traffic violation has been identified.

20. A method according to claim 16 further comprising causing a map to be generated that represents a number of traffic violations that have been identified at one or more locations upon the map.

* * * * *